(12) United States Patent
Sridhar et al.

(10) Patent No.: US 10,951,396 B2
(45) Date of Patent: Mar. 16, 2021

(54) TAMPER-PROOF MANAGEMENT OF AUDIT LOGS

(71) Applicant: Nutanix, Inc., San Jose, CA (US)

(72) Inventors: Manjula Sridhar, Bangalore (IN); Tushar Gupta, Bangalore (IN); Vijay Rayapati, Bangalore (IN); Yuvaraj Loganathan, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 218 days.

(21) Appl. No.: 16/166,190

(22) Filed: Oct. 22, 2018

(65) Prior Publication Data

US 2020/0127811 A1     Apr. 23, 2020

(51) Int. Cl.
*H04L 29/06* (2006.01)
*H04L 9/06* (2006.01)
*G06F 21/60* (2013.01)

(52) U.S. Cl.
CPC .......... *H04L 9/0637* (2013.01); *G06F 21/602* (2013.01); *H04L 9/0643* (2013.01); *H04L 2209/38* (2013.01)

(58) Field of Classification Search
CPC . G06F 21/602; H04L 2209/38; H04L 9/0637; H04L 9/0643
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 2017/0286717 | A1* | 10/2017 | Khi ........................ H04L 63/08 |
| 2018/0157700 | A1* | 6/2018 | Roberts ................ G06F 16/2365 |
| 2019/0034663 | A1* | 1/2019 | Katikala ............... H04L 9/3239 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Beemnet W Dada
*Assistant Examiner* — Ka Shan Choy
(74) *Attorney, Agent, or Firm* — Iphorizons PLLC; Narendra Reddy Thappeta (57) ABSTRACT

According to an aspect of the present disclosure, the records of an audit log are stored using blockchain technology. The audit log is accordingly rendered immutable and thus tamper proof. According to another aspect of the present disclosure, the identity of each user is mapped to a corresponding code value using a one-way-function (that is, the user identity cannot be practically be deciphered from the code value). A table is maintained with entries mapping the user identifiers to the code value. The records in the audit log are stored with the user identifiers substituted by the code values. The log records corresponding to the user are made unidentifiable associated with the user by deleting the table entry corresponding to the user identifier of the user. Accordingly the 'right to be forgotten' may be supported. Another aspect extends such a right to general records.

18 Claims, 9 Drawing Sheets

(56) References Cited

U.S. PATENT DOCUMENTS

2020/0007344 A1* 1/2020 Chepak, Jr. ............ H04L 9/0643
2020/0118124 A1* 4/2020 Menon .................. H04L 9/0643

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Ignacio Cano, et al., Curator: Self-Managing Storage for Enterprise Clusters, https://www.usenix.org/conference/nsdi17, Mar. 27-29, 2017, 16 pages, Boston, MA, Nutanix Inc.

* cited by examiner

| User ID | Hash Value |
|---|---|
| user1@gmail.com | 39329e3e3dc847bb51beb249a68e7ac0 |
| user2@gmail.com | fa7c3fcb670a58aa3e90a391ea533c99 |
| user3@gmail.com | 59029276955677351421b3ff6bf5ee4c |
| user4@gmail.com | a3012064ea70afa9351e80e4a62b5dcb |

*FIG. 5*

605 → 2018-08-21 02:06:39,614] INFO {AUDIT_LOG}- 'admin@carbon.super [-1234]'
610 → logged in at [2018-08-21 02:06:39,614-0700]
615 → [2018-08-21 02:07:14,678] INFO {AUDIT_LOG}- Initiator : admin@carbon.super |
620 → Action : Adding User | Target : user1@gmail.com | Data : { Roles : Calm User, Beam User} |
625 → Result : Success

*FIG. 6A*

650 → 2018-08-21 02:06:39,614] INFO {AUDIT_LOG}- 'admin@carbon.super [-1234]'
655 → logged in at [2018-08-21 02:06:39,614-0700]
660 → [2018-08-21 02:07:14,678] INFO {AUDIT_LOG}- Initiator : admin@carbon.super |
665 → Action : Adding User | Target : 39329e3e3dc847bb51beb249a68e7ac0 |
670 → Data : { Roles : Calm User, Beam User} |
675 → Result : Success

TAMPER-PROOF MANAGEMENT OF AUDIT LOGS

BACKGROUND

Technical Field

Embodiments of the present disclosure relate generally to audit logs generated in digital systems, and more specifically to tamper-proof management of such audit logs.

Related Art

Audit logs refer to entries which record activities of interest that have occurred in digital systems. The recorded activities indicate events such as persons logging in/out, the resources used by such persons, the changes made, etc., with applicable time stamps. The information in audit logs is often used for purpose of identifying or investigating fraudulent activities, in addition to questions on usage of any specific resources in or via such digital systems.

There is a general need to ensure that audit logs are not tampered with, i.e., added to, modified or deleted. For example, hackers may wish to remove traces of all hacking related activities by removing the corresponding entries of the log, or even worse by deleting the entire log. Aspects of the present disclosure are related to providing tamper-proof management of audit logs.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, the records of an audit log are stored using blockchain technology. The audit log is accordingly rendered immutable and thus tamper proof.

According to another aspect of the present disclosure, the identity of each user is mapped to a corresponding code value using a one-way-function (that is, the user identity cannot be practically be deciphered from the code value). A table is maintained with entries mapping the user identifiers to the code value. The records in the audit log are stored with the user identifiers substituted by the code values. The log records corresponding to the user are made unidentifiable associated with the user by deleting the table entry corresponding to the user identifier of the user. Accordingly the 'right to be forgotten' may be supported.

According to yet another aspect of the present disclosure, the right to be forgotten is extended to general records (other than audit records as well).

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
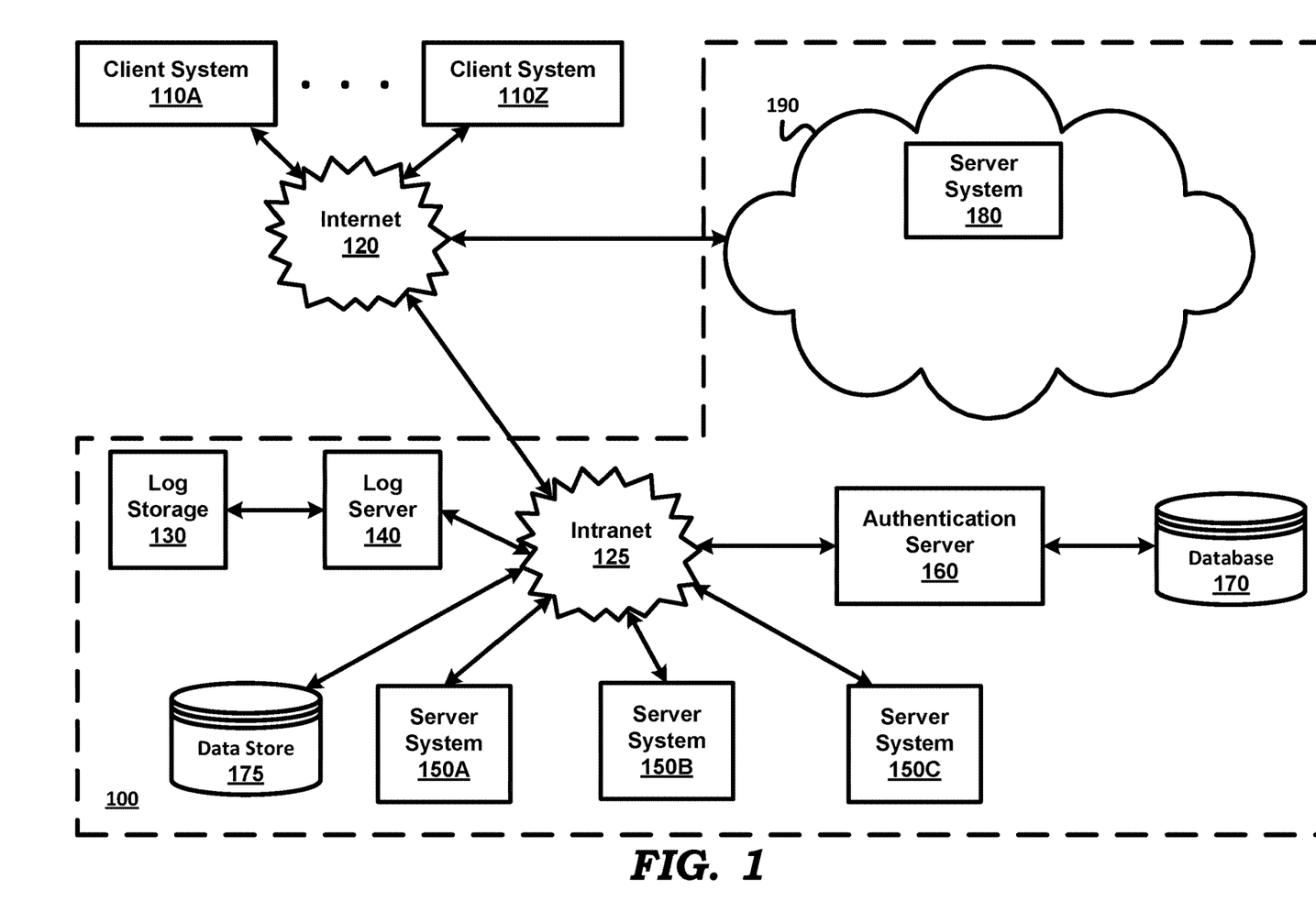
FIG. 1 is a block diagram illustrating an example environment in which several aspects of the present disclosure can be implemented.

FIG. 1 is a block diagram of an example environment in which several aspects of the present disclosure can be implemented. The block diagram is shown containing client systems 110A-110Z, internet 120, intranet 125, log storage 130, log server 140, server systems 150A-150C, authentication server 160, database 170, data store 175 and cloud 190. Cloud 190 is in turn shown containing server system 180. Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160A-160C, log server 140, authentication server 160 and data store 175, all provided physically within an enterprise 100 (as indicated by the dotted boundary). Internet 120 extends the connectivity of these (and other systems of the enterprise) with external systems such as client systems 110A-110Z, as well as server system 180 on cloud 190.

Each of Internet 120 and intranet 125 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies the target application, the packet may be said to be directed to such application as well.

Each of client systems 110A-110Z represents a system such as a personal computer, workstation, mobile device, computing tablet etc., used by users to generate client requests directed to enterprise applications executing in server systems 160A-160C and cloud 190. In one embodiment, the client requests are directed to invoking web services exposed by server systems 160A-160C and cloud 190, with each web service being available at a corresponding end point. Each web service may provide multiple web service operations corresponding to enterprise functionalities sought to be exposed.

The client requests may be generated using appropriate user interfaces (e.g., web pages provided by an application executing in server systems and/or the cloud, a native user interface provided by a portion of the application downloaded from server systems, the cloud, etc.). In general, a client system requests an enterprise application/web service for performing desired tasks/web service operations and receives the corresponding responses (e.g., web pages) containing the results of performance of the requested tasks. The web pages/responses may then be presented to the user by client applications such as a browser. Each client request is sent in the form of an IP packet directed to the desired server system, application or web service, with the IP packet including data identifying the desired tasks/web service operations in the payload portion.

Cloud 190 represents collection of servers distributed potentially in many datacenters spread across distant locations although only server system 180 is shown in FIG. 1 for conciseness. The servers are connected to and accessible via Internet 120. The servers in cloud 190 may be operated by the same organization as the one that operates server systems 150A-150C. Thus, enterprise 100 may be viewed as logically including all the systems/components (including cloud 190) shown contained inside the area within dashed lines in FIG. 1.

Data store 175 represents a non-volatile (persistent) storage facilitating storage and retrieval of a collection of data by applications executing in server systems 160A-160C. Data store 175 may be implemented as a database server using relational database technologies and accordingly provide storage and retrieval of data using structured queries such as SQL (Structured Query Language). Alternatively, data store 175 may be implemented as a file server providing storage and retrieval of data in the form of files organized as one or more directories, as is well known in the relevant arts. Although not shown, cloud 190 may also contain one or more data stores for facilitating storage and retrieval of data by applications executing in server system 180.

Each of server systems 160A-160C and server system 180 (on cloud 190) represents a server, such as a web/application server, executing server applications and web services performing tasks/web service operations requested by users using one of client systems 110A-110Z. A server system may use data stored internally (for example, in a non-volatile storage/hard disk within the server system), external data (e.g., maintained in data store 180 or other persistent storage) and/or data received from external sources (e.g., from the user) in performing the requested tasks/web service operations. The server system then sends the result of performance of the tasks/web service operations to the requesting client system (one of 110A-110Z). The results may be accompanied by specific user interfaces (e.g., by way of web pages) for displaying the results to the requesting user.

Authentication server 160 regulates access to servers systems in enterprise 100 by users of client systems 110A-110Z. Thus, authentication server may store in database 170, user credentials, such as user ID (identification) and password, of users that are authorized/permitted to access server systems in enterprise 100 for various services. Prior to accessing services provided by server systems in Enterprise 100, a user logs-in to enterprise 100 with his user ID and password. Authentication server 160 receives the user ID and password, and checks if the user ID and password matches with an entry in database 170. Authentication server 170 allows the user to use services provided by the servers only if there is a match. An administrator of enterprise 100 may create/update the entries (user credentials) in data store 170.

Log server 140 records, in log storage 130, all activities of a user that occur in the course of a user session in enterprise 100, in addition to any other system activities of interest in enterprise 100. Examples of such activities include details (including time stamps) of log-on, services requested, identification of changes made to data stored in data store 175, log out, etc. Each server may locally log user activity, and forward these to log server 140 for storing in log storage 130. The details of all logs in log storage 130 may be analyzed (audited) by personnel (e.g., administrator) in Enterprise 100 either routinely at regular intervals, or in the event of any anomaly (for example, unauthorized deletion of data) detected in systems of enterprise 100. In general, as noted above, the audit logs serve the purpose of identifying or investigating fraudulent activities, in addition to questions on usage of any specific resources in enterprise 100.

One drawback of the operation of enterprise 100 with respect to managing audit logs as noted above is that a hacker (or even an administrator) can tamper with the audit logs stored in log storage 130. For example, a hacker may wish to remove traces (e.g., erase) of all hacking related activities recorded in the audit logs.

The manner in which audit logs are managed in a tamper-proof manner according to one or more aspects of the resent disclosure is described next in detail.

3. Tamper-Proof Management of Audit Logs

Figure 2A:
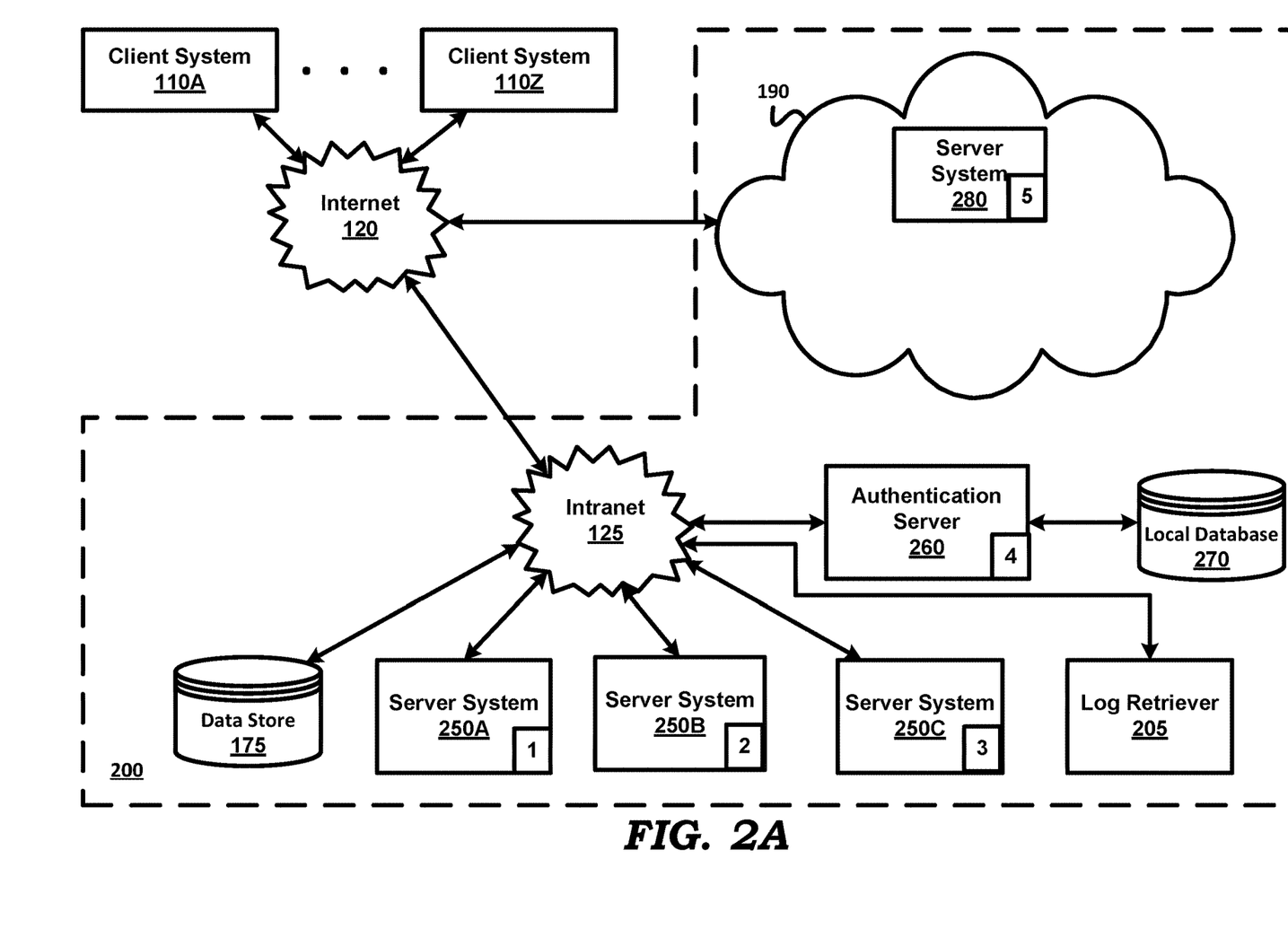
FIG. 2A is a block diagram illustrating the manner in which audit logs are made tamper-proof in an embodiment of the present disclosure.

FIG. 2A is a block diagram illustrating the manner in which audit logs are made tamper-proof in an embodiment of the present disclosure. FIG. 2A is shown containing client systems 110A-110Z, internet 120, intranet 125, log retriever 205, server systems 250A-250C (respectively in place of 150A-150C of FIG. 1), authentication server 260 (in place of authentication server 160 of FIG. 1), local database 270 (in place of database 170 of FIG. 1), data store 175 and server system 280 (in place of server system 180). Enterprise 200 may be viewed as logically including all the systems/components (including cloud 190) shown contained inside the area within dashed lines in FIG. 2A.

Client systems 110A-110Z, intranet 120, internet 125 and data store 175 operate as described above with respect to FIG. 1, and their description is not repeated here in the interest of conciseness. Log retriever 205 retrieves audit logs stored in enterprise 200, and provides the audit logs to an administrator or user for analysis as described below.

According to an aspect of the present disclosure, each of server systems 250A-250C, authentication server 260 and server system 280 is designed to implement respective nodes 1-5 of a blockchain technology. Thus, nodes 1-5 together form and operate blockchains.

As is well known in the relevant arts, blockchain technology provides a distributed and de-centralized system with shared state, in which all participants (nodes) may be geographically distributed. Blockchain technology uses a chain of blocks to store data records, with each block in the chain storing the signature (e.g., in the form of a cryptographic hash) of the previous block, a timestamp, and transaction data. Consistency of a signature (in a current block) with the content of the previous block is deemed to be a condition of the existence of a valid link in the chain between the previous block and the current block. Accordingly, any change in one block of the chain would require alteration of all subsequent blocks in the chain for the validity of the corresponding chain. Thus, data records in a blockchain is designed to be foolproof against changes, i.e., is immutable. Thus, a blockchain may be operated as an immutable chain for recording transactions, maintained within a distributed network of mutually potentially untrusting nodes. Every node maintains a copy of the chain.

For clarity and consistency, the terms "blockchain technology", "blockchain node", "blockchain block", "blockchain link" and "blockchain chain" are used hereinafter to refer respectively to the technology, node, block, link and chain referred to in the preceding paragraph.

In an embodiment, blockchain nodes 1-5 are implemented to realize a permissioned private blockchain platform, as is suitable in closed enterprises. Additionally, server systems 250A-250C, authentication server 260 and server system 280 may also be designed to provide capabilities similar to those of server systems 150A-150C, authentication server 160 and server system 180 respectively of FIG. 1. Authentication server 260 may store user credentials in database 270.

Thus, when a data record for logging into an audit log (the audit log being in the form of a corresponding blockchain chain) is generated by any of the servers, the generated record is added to a blockchain block of the blockchain chain by the specific one of the blockchain nodes 1-5 generating the record. Thus, the audit log is maintained to be thereafter immutable. The manner in which each of the servers of enterprise 200 can be implemented is described first below with respect to FIGS. 2B and 2C.

4. Server System

Figure 2B:
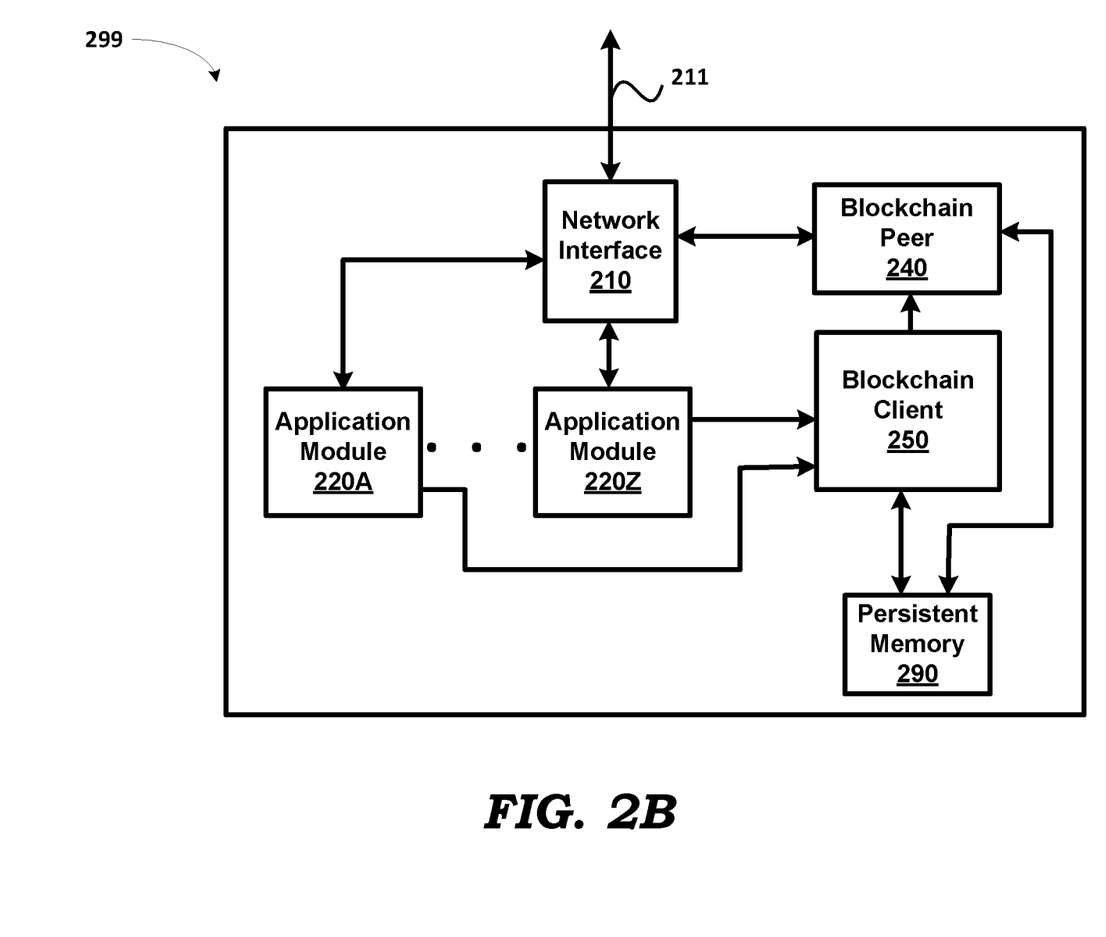
FIG. 2B is a block diagram depicting the internal implementation of server systems implementing nodes of a blockchain in an embodiment of the present disclosure.
Figure 2C:
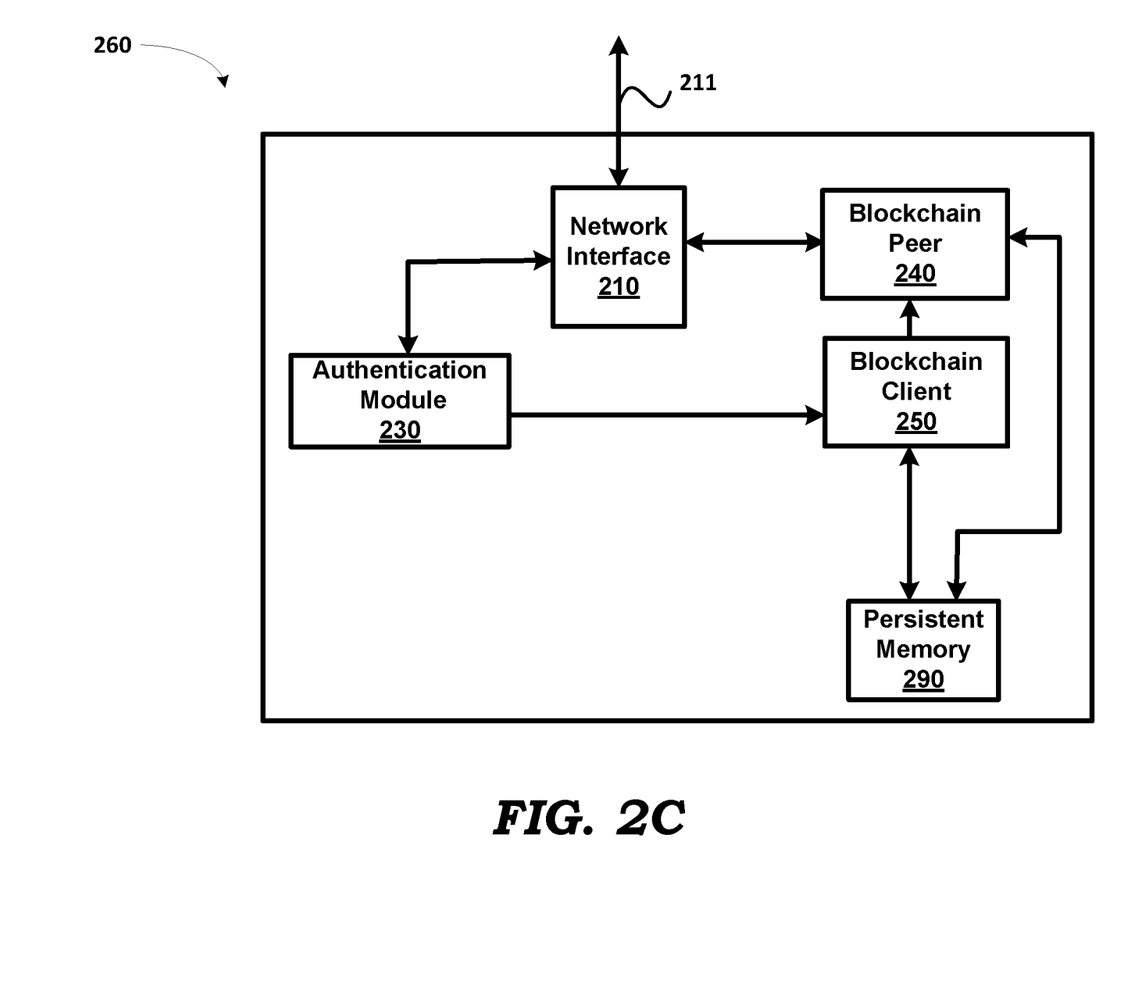
FIG. 2C is a block diagram depicting the internal implementation of authentication server also implementing a corresponding node of a blockchain in an embodiment of the present disclosure.

FIG. 2B is a block diagram illustrating relevant internal implementation details of a server system implemented according to aspects of the present disclosure. Server system 299 is shown containing network interface 210, application modules 220A-220Z, blockchain peer 240, blockchain client 250 and persistent memory 290. Server system 299 may correspond to any of server systems 250A-250C, and server system 280. On the other hand authentication server 260 of FIG. 2C is shown containing authentication module 230, in addition to network interface 210, blockchain peer 240 and blockchain client 250. Blocks that can be implemented similarly are shown with the same label and reference numerals. The two systems 299 and 260 are described together below.

Network interface 210 provides electrical and logical/protocol interface (e.g., Ethernet) to enable server system 299 and authentication server 260 to communicate with other systems of FIG. 2 via intranet 125 and path 211. Thus, network interface 210 may receive a data packet from any of the modules 220A-220Z (of FIG. 2B), authentication module 230 (of FIG. 2C), and blockchain peer 240/blockchain client 250 (of each of FIGS. 2B and 2C), format the packet to be consistent with the network protocol, and transmit the packet on path 211. Network interface 210 may receive a formatted packet on path 211 from an external system, de-format the packet to extract the data portion in the packet, and forward the data to the corresponding destination module (one of modules 220A-220Z (in case of FIG. 2B), authentication module 230 (in case of FIG. 2C), blockchain peer 240 and blockchain client 250 (of each of FIGS. 2B and 2C).

Persistent memory 290 represents a non-volatile memory used to store blockchain blocks of corresponding blockchain chains, with the blockchain blocks being generated by blockchain client 250 or received from other blockchain nodes by blockchain peer 240.

Each of application modules 220A-220Z represents an application executing in server 299. Example applications include web server application, email server application, etc. The application modules receive requests for a corresponding service (web/email) from a user of client systems 110A-110Z, process the requests, and provide the result of the processing to the user. When a user activity (e.g., request for service provided by an application) occurs in enterprise 200, the corresponding one of application modules 220A-220Z may generate a new data record representing the user activity, and forwards the data record to blockchain client 250 in the same blockchain node.

Authentication module 230 (of FIG. 2C) operates to authenticate users' access to services/applications provided in enterprise 200. Thus, authentication module 230 (of FIG. 2C) may receive user ID and password from a user, check if the user ID and password matches with an entry in local database 270, and allow the user to use services provided by the servers of enterprise 200 only if there is a match. An administrator of enterprise 200 may create/update the user credentials in local database 270. Local database 270 is additionally used for storing a table mapping user identifiers to corresponding coded values, as described below.

Authentication module 230 also creates data records upon each user activity involving authentication server 230, such as for example, creation of a user account, deletion of the user account, logging in and logging out of the user to/from enterprise 200, etc. Authentication module 230 forwards the created data record to blockchain client 250 in server 260.

Blockchain client 250 receives data records (from application modules 220A-220Z in FIG. 2B and authentication module 230 of FIG. 2C), incorporates the received data records into a blockchain block (or creating a new one if needed) and adds the blockchain block to the corresponding blockchain chain (or creating a new blockchain chain if needed) in persistent memory 290. Blockchain client 250 also forwards the blockchain block to the blockchain peer 240 in the same blockchain node for forwarding to the other blockchain nodes.

Blockchain peer 240 receives newly created blockchain blocks from blockchain client 250 of the same blockchain node, and forwards (e.g., by broadcasting) the newly created blockchain blocks to each of the blockchain peers in the other blockchain nodes. Blockchain peer 240 receives blockchain blocks newly created in the other blockchain nodes, adds the received blockchain blocks to corresponding blockchain chains in persistent memory 290 (or creating a new blockchain chain if needed). Thus, each of blockchain nodes 1-5 maintains a copy of every blockchain chain.

Although not noted above, blockchain peer 240 may encrypt a new blockchain block prior to forwarding the new blockchain block to the other blockchain nodes. At the other end, blockchain peer 240 of the corresponding blockchain node decrypts the received blockchain block, prior to addition to the respective blockchain chain and storage in persistent memory 290 as noted above. The encryption and decryption may use encrypt and decrypt keys generated according to public key infrastructure (PKI) technology well known in the relevant arts.

The description is now continued with respect to example audit logs stored using blockchain technology.

5. Example Audit Logs Stored According to Blockchain Technology

Figure 6A:
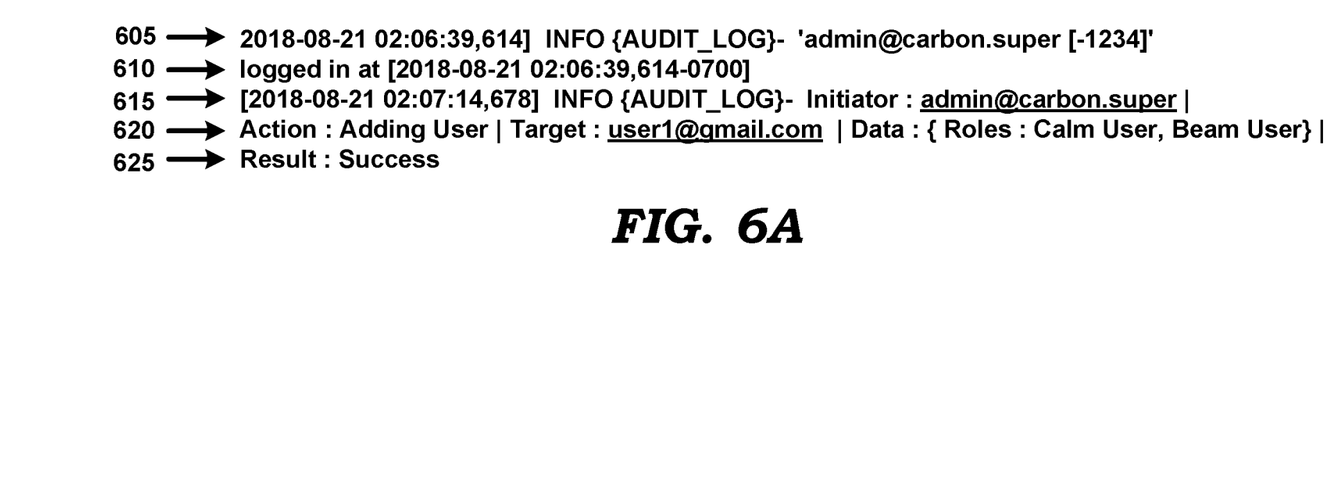
FIG. 6A depicts a snippet of audit logs generated in an embodiment of the present disclosure, in which a user's right to be forgotten is not supported.

An example illustration of the use of a blockchain in managing audit logs in a tamper-proof manner is now provided. In the example, an administrator adds a new user to access servers in enterprise 200, and performs the corresponding operations at authentication server 260 to add the new user. FIG. 6A lists data records created and stored according to the example.

When the administrator logs in to enterprise 200 (via any of client systems 210A-210Z and authentication server 260), authentication module 230 generates the data record shown in lines 605, 610 and 615, which together indicate that the administrator (having email ID admin@carbon.super) logged in at time 02:06:39 on 2018 Aug. 21, and that the administrator is the initiator of the user-activity.

The administrator then adds a user having a user ID user1@gmail.com to enterprise 200, and authorizes the user to access services named "Calm" and "Beam" provided by corresponding application modules in enterprise 200. In response, authentication module 230 generates the data record shown at lines 620 and 625, which indicates that the administrator successfully added a user, that the user's identity is user1@gmail.com, and that the user is allowed to use services 'Calm' and 'Beam'.

Authentication module 230 then forwards the data records generated as noted above to blockchain client 250 of FIG. 2C. Blockchain client 250, in turn, incorporates the received data records into a blockchain block (or creating a new one if needed) and adds the blockchain block to the corresponding blockchain chain (or creating a new blockchain chain if needed) in persistent memory 290. Blockchain client 250 also forwards the blockchain block to blockchain peer 240 of FIG. 2C. Blockchain peer 240 broadcasts the blockchain block to the other blockchain nodes. The blockchain peers of the other blockchain nodes store the received blockchain block in corresponding blockchain chain (local copy) in persistent memory in the blockchain nodes.

Thus, the activities described above are stored in immutable form using blockchain technology.

A user or an administrator can request for the stored the audit log (i.e., the blockchain chain containing the data shown in FIG. 6A) by sending the request to log retriever 205 (shown in FIG. 2A) for retrieval of the audit log. Upon receiving the request, log retriever 205 retrieves a copy of the audit log stored in any of blockchain nodes 1-5, and provides the copy to the user/administrator. The user/administrator can then analyze the audit log for purposes such as determining resource utilization, monitoring of user activities in enterprise 200, etc.

While the example of FIG. 6A is provided with respect to authentication server 260, server systems 250A-250C and server system 280 can also create and add to blockchains corresponding user activities that involve server systems 250A-250C and server system 280.

It may be observed from the audit log shown in FIG. 6A that the identity (personal data) of the user (user1@gmail.com) is stored in the audit log, and cannot be erased or hidden due to immutability provided by blockchain technology. There may be several situations in which it may not be desired or even allowed to store personal data of users without the giving the users the benefit of having their personal details removed or be hidden from others, such benefit being termed right-of-erasure or right-to-be-forgotten. For example, the General Data Protection Regulation 2016/679 (GDPR), which is a regulation in EU law on data protection and privacy for people within the European Union and the European Economic Area, requires that a user be given such right upon unsubscribing from service(s) for which the user is registered in a digital system.

According to another aspect of the present disclosure, the right-to-be-forgotten of a user is ensured while still using a blockchain for storing audit logs, as described next. It should be appreciated that the right-to-be-forgotten can be implemented for other types of data records also (e.g., a user's photos or blogs on public medium) as will be apparent to a skilled practitioner by reading the disclosure provided herein.

6. Ensuring User's Right-to-be-Forgotten

In another embodiment of the present disclosure directed to ensuring a user's right-to-be-forgotten, blockchain nodes 1-5 of FIGS. 2A, 2B and 2C are implemented to perform the operations described below with respect to FIGS. 3 and 4. Only the differences in operation of blockchain nodes 1-5 from the description and implementation provided above with respect to FIG. 2A are noted below, and nodes 1-5 may otherwise be implemented as described above.

Figure 3:
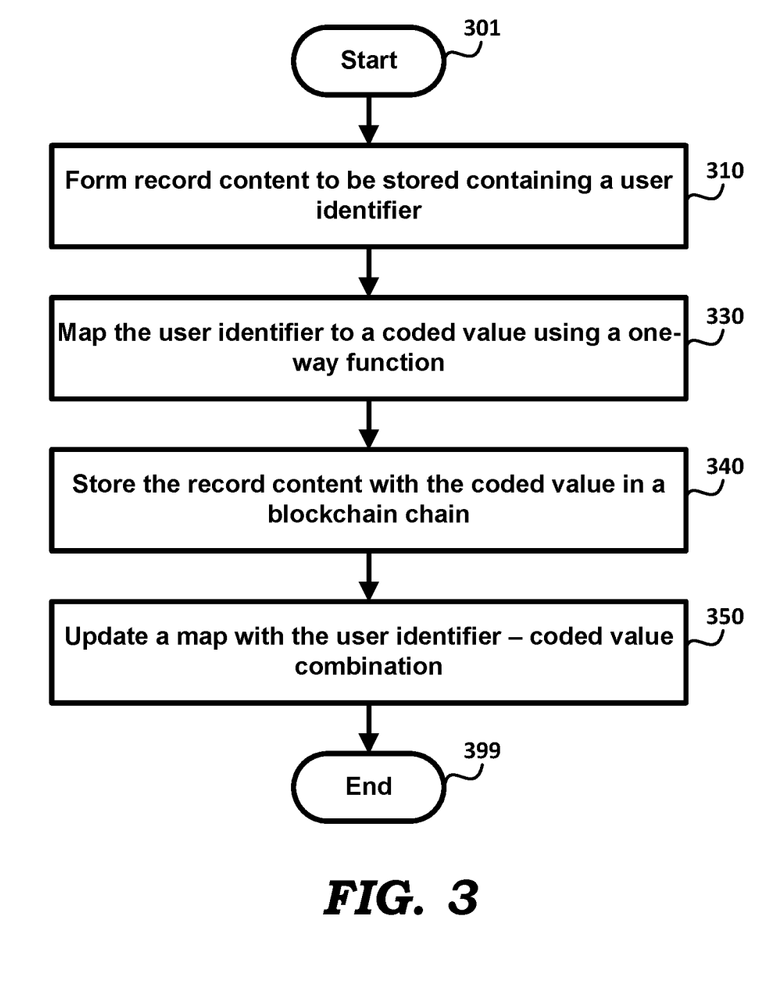
FIG. 3 is a flow chart illustrating the manner in which a tamper proof audit log supports right-to-erasure (or not to be remembered) in an embodiment of the present disclosure.
Figure 4:
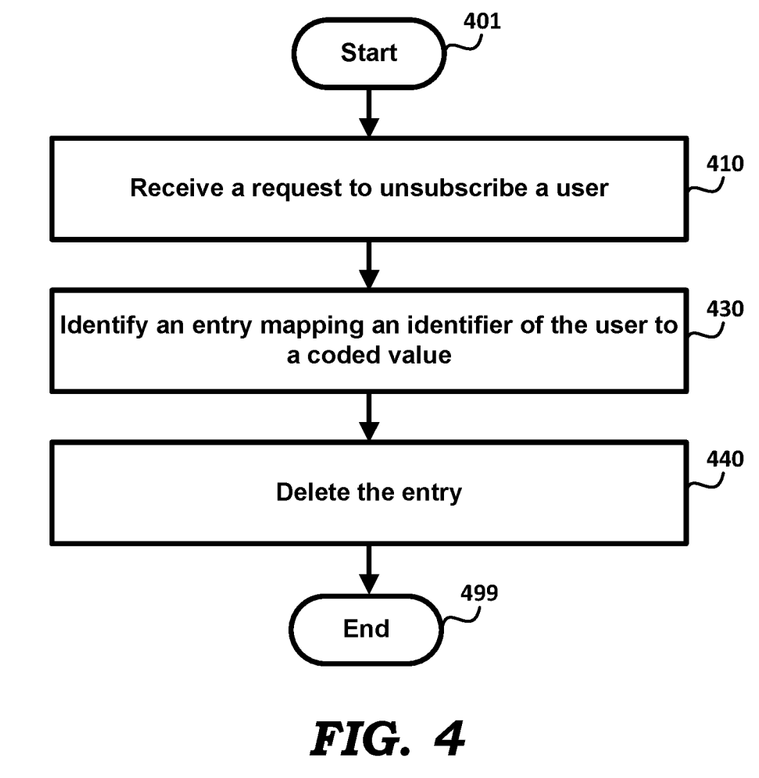
FIG. 4 is a flow chart illustrating the manner in which a user's right to be forgotten is implemented in an embodiment of the present disclosure.

FIGS. 3 and 4 are flow charts illustrating the operations in authentication server 260 in providing tamper-proof management of audit logs while ensuring a user's right-to-be-forgotten, according to aspects of the present disclosure. The operations in the flowcharts are described with respect to authentication server 260 and authentication module 230 merely for illustration. However, many of the features can be implemented in other systems and environments also without departing from the scope and spirit of several aspects of the present disclosure, as will be apparent to one skilled in the relevant arts by reading the disclosure provided herein. In addition, some of the steps may be performed in a different sequence than that depicted below, as suited to the specific environment, as will be apparent to one skilled in the relevant arts. Many of such implementations are contemplated to be covered by several aspects of the present disclosure.

The flow chart of FIG. 3 begins in step 301, in which control immediately passes to step 310.

In step 310, authentication module 230 forms a record content to be stored containing a user identifier. For example, when an administrator logs into authentication server 260 and adds a new user to access services in enterprise 200, authentication server 230 forms corresponding content reflecting the activity. Control then passes to step 330.

In step 330, authentication module 230 maps the user identifier to a coded value using a one-way function. A one-way function is a function that maps a set of inputs to respective ones of a set of outputs, with the property that it is easy to compute an output given an input, but is fairly difficult to compute the input from the output. One example of a one-way function is a hash function (which generates codes of fixed length), and is used in an embodiment of the present disclosure. Mapping refers to creating a user identifier-coded value pair as a one-to-one relation. Control then passes to step 340.

In step 340, blockchain client 250 stores the record content with the coded value (in lieu of the user id) in a blockchain block of blockchain chain (in persistent memory 290 of FIG. 2C). Blockchain client 250 forwards the blockchain block, as well as the user-identifier-coded value pair to blockchain peer 240, which then broadcasts the block and pair to the other blockchain nodes. The blockchain peers of the other blockchain nodes store the received block in a corresponding blockchain chain in persistent memory 290. Control then passes to step 350.

In step 350, blockchain client 250 updates a table in local database 270 with the user identifier-coded value pair. Additionally, each of the other blockchain nodes also may store the user-identifier-coded value pair locally to enable formation of audit logs there with the coded-value in place of the user identifier. In general, each of server systems 250A-250C and server system 280 locally (e.g., in RAM) stores table 500 (described below). Alternatively or in addition, authentication module 230 may be designed to provide the mapping upon request to other servers. Control then passes to step 399, in which the flowchart ends.

Figure 5:
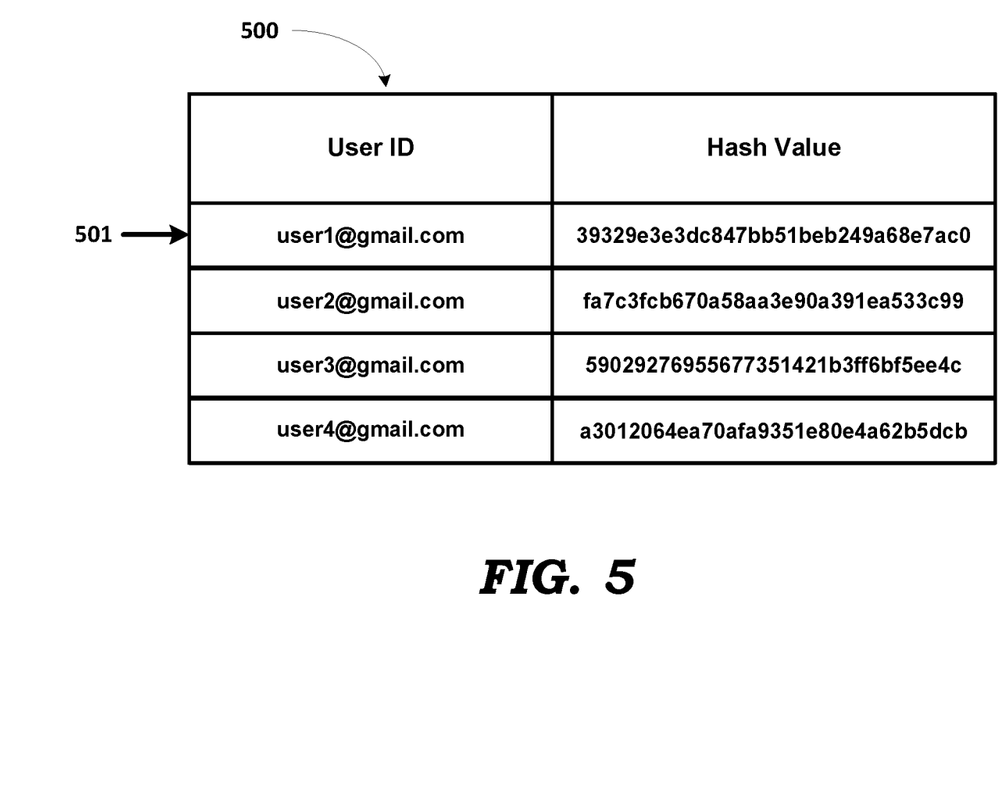
FIG. 5 is a block diagram illustrating example data structures supporting right to erasure in an embodiment of the present disclosure.
Figure 6B:
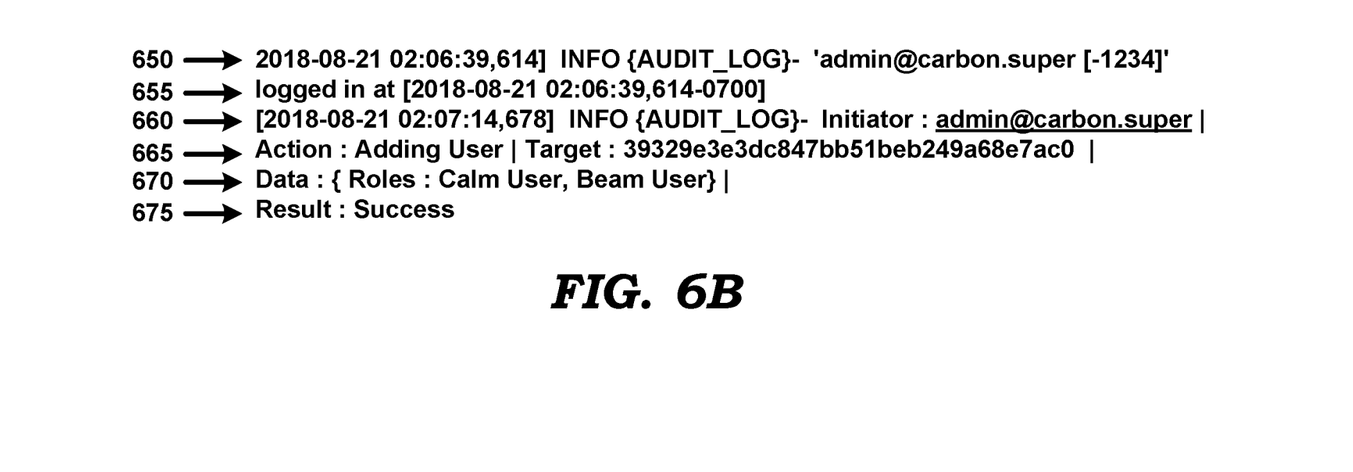
FIG. 6B depicts a snippet of audit logs generated in an embodiment of the present disclosure, in which a user's right to be forgotten is supported.

The operations of the flowchart of FIG. 3 are illustrated with respect to a portion of an example audit log shown in FIG. 6B and table 500 of FIG. 5. Table 500 of FIG. 5 contains entries that map user identifiers (in column 'user ID') to corresponding coded values (in column 'hash values') created and stored in local database 270 by authentication server 260. Four mappings are shown in Table 500, corresponding respectively to four user identifiers, namely user1@gmail.com, user2@gmail.com, user3@gmail.com and user4@gmail.com.

The audit log shown in FIG. 6B is identical to that in FIG. 6A, except that the user ID 'user1@gmail.com' in line 620 of FIG. 6A is substituted by the hash value '39329e3e3dc847bb51beb249a68e7ac0' corresponding to 'user1@gmail.com' (as in table 500). Thus, the data portions indicated by numerals 650, 655, 660, 665, 670 and 675 are created as described above with respect to FIG. 6A, except that blockchain client 250 now stores the code value "39329e3e3dc847bb51beb249a68e7ac0" in place of user1@gmail.com. Additionally, blockchain client 250 broadcasts the user1@gmail.com- "39329e3e3dc847bb51beb249a68e7ac0" pair to the other blockchain nodes, which then locally store (or request later) the pair for use as described above.

A user/administrator can retrieve and analyze the audit log in the same manner as described above, except that log retriever 205 retrieves the data records with code values from blockchain chain, substitutes the respective user IDs for the code values, and forwards the data record with the substitution to the user/administrator. Accordingly, the user/administrator may view data records similar to the ones of FIG. 6A (i.e., with the userid restored).

When a user unsubscribes from services provided by enterprise 200, authentication server 260 operates according to the flowchart of FIG. 4 to ensure the user's right-to-be-forgotten is complied with. The flowchart starts at step 401, in which the control passes immediately to step 410.

In step 410, authentication module 230 receives a request from a user to unsubscribe (to be forgotten) from services in enterprise 200. Control then passes to step 430.

In step 430, authentication module 230 identifies an entry in table 500 mapping an identifier of the user to a corresponding coded value. Control then passes to step 440.

In step 440, authentication module 230 deletes the mapping from the local data store, leaving the other portions of the audit log related to the user in the blockchain chain unchanged. Control then passes to step 499 in which the flowchart ends.

To illustrate with respect to the example of FIG. 6B and table 500 of FIG. 5, upon receiving a request from user1 to unsubscribe, authentication module 230 identifies entry 501 mapping 'user1@gmail.com' to '39329e3e3dc847bb51beb249a68e7ac0' in table 500 stored in local database 270, and deletes entry 501 from table 500, while leaving the audit log of FIG. 6B unchanged.

Thereafter, the blockchain data with the hash value corresponding to '39329e3e3dc847bb51beb249a68e7ac0' cannot be related to user1@gmail.com since the corresponding entry is no longer present in table 500 and also since user1@gmail.com cannot be constructed from the hash value (since one-way hash has been used). Accordingly, the user's right-to-be-forgotten is complied with.

Thus, tamper-proof management of audit logs is provided while also ensuring a user's right-to-be-forgotten. It should be appreciated that the right-to-be-forgotten can be used with other types of data as well.

It should be further appreciated that the features described above can be implemented in various embodiments as a desired combination of one or more of hardware, executable modules, and firmware. The description is continued with respect to an embodiment in which various features are operative when the software instructions described above are executed.

7. Digital Processing System

Figure 7:
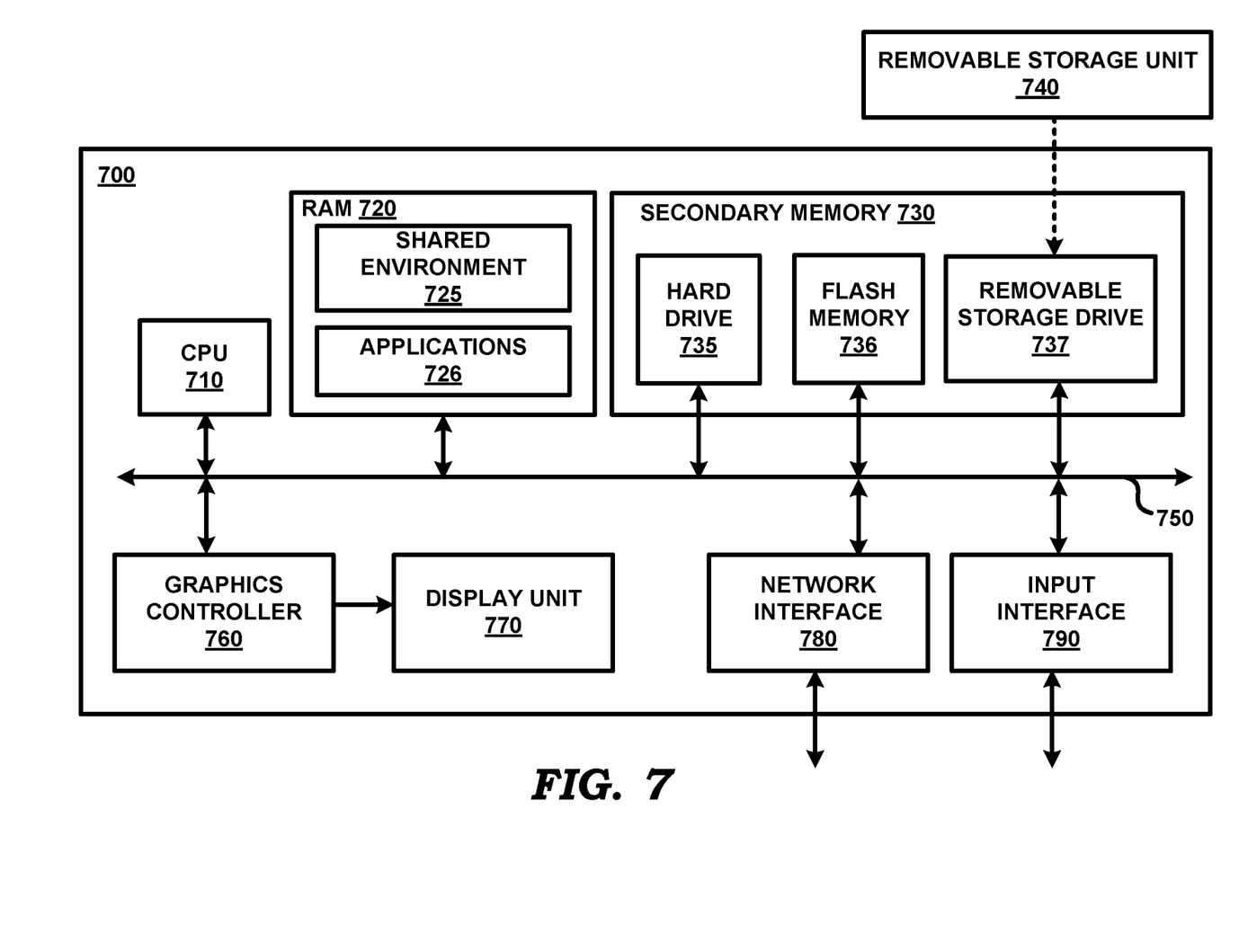
FIG. 7 is a block diagram illustrating the details of a digital processing system in which various aspects of the present disclosure are operative by execution of appropriate executable modules.

FIG. 7 is a block diagram illustrating the details of a digital processing system 700 in which various aspects of the present disclosure are operative by execution of appropriate executable modules. Digital processing system 700 can correspond to any of server systems 250A-250C, authentication server 260 and server system 280 of FIG. 2B.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 670 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and applications 726. Shared environment 725 includes operating systems, device drivers, virtual machines, etc., which provide a (common) run time environment for execution of user programs 726. Applications 726 corresponds to one or more of applications modules 220A-220Z and authentication module 230. Additionally, when digital processing system 700 represents server systems 250A-250C or server system 280, RAM 720 may store the entries of table 500, as noted above.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) that may be used to provide appropriate inputs. Network interface 780, corresponds to network interface 210, and provides connectivity to a network (e.g., using Internet Protocol).

Secondary memory 730 may contain hard drive 735, flash memory 736, and removable storage drive 737. Secondary memory 730 contains instructions (for example, instructions representing the modules of FIGS. 2B and 2C, except network interface 210), which enable digital processing system 700 to provide several features in accordance with the present disclosure. Secondary memory 730 includes persistent memory 290 of FIGS. 2B and 2C, and may store the audit logs in the form of blockchains as described above. The code/instructions stored in secondary memory 730 either may be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A system comprising:
   one or more digital systems operating to generate a plurality of records of an audit log;
   a plurality of nodes together storing said plurality of records using blockchain technology,
   wherein a first set of records of said plurality of records relate to respective users having corresponding identities; and
   a non-volatile storage, provided outside of said blockchain technology, to store a mapping of each identity to a corresponding value generated by a one-way-function for that identity,
   wherein said plurality of records contain only the corresponding value for each occurrence of the corresponding identity.

2. The system of claim 1, wherein the mapping of the identity of a first user to the corresponding value is deleted from said non-volatile memory to make records corresponding to said first user to be thereafter unidentifiable as being related to said first user.

3. The system of claim 1, wherein said one-way function is a one-way hash function.

4. The system of claim 1, wherein systems in said one or more digital systems provide one or more services to registered users, wherein each of said plurality of nodes is contained in a respective ones of said one or more digital systems, each of said plurality of nodes storing a local copy of said first set of records.

5. The system of claim 1, wherein said one or more digital systems contains an authentication server operable to create said first set of records, said first set of records containing a first record indicating that an administrator of said one or more digital systems has added a new user to access one or more services provided by said one or more digital systems, said new user being said first user, said first record further containing a hash value corresponding to an identity of said first user, said hash value being generated by said one-way hash function.

6. The system of claim 5, wherein said first record is stored in each of said plurality of nodes as a corresponding blockchain block according to blockchain technology.

7. A method of managing data records, said method comprising:
    maintaining a map of each of a plurality of identifiers to a corresponding coded value of a plurality of coded values, wherein each coded value is generated using a one-way function from the corresponding user identifier;
    storing in a blockchain, a data record with a first coded value corresponding to a first identifier, wherein said map is maintained external to said blockchain;
    to retrieve said data record corresponding to said first identifier:
        identifying said first coded value corresponding to said first identifier according to said map;
            accessing said data record from said blockchain using said first coded value identified using said map.

8. The method of claim 7, wherein said data records are of users and each of said plurality of identifiers comprises a user identifier, wherein said data record is of a first user having a first user identifier comprising said first identifier, said method further comprising deleting a mapping of said first user identifier to said first coded value.

9. The method of claim 8, wherein said one-way function is a one way hash function.

10. A non-transitory machine readable medium storing one or more sequences of instructions for enabling one or more digital processing systems to provide tamper proof audit logs, wherein execution of said one or more instructions by one or more processors contained in said one or more digital processing systems causes said one or more digital processing systems to perform the actions of:
    generating a plurality of records of an audit log;
    storing said plurality of records using blockchain technology,
    wherein a first set of records of said plurality of records relate to respective users having corresponding identities; and
    storing, in a non-volatile storage provided outside of said blockchain technology, a mapping of each identity to a corresponding value generated by a one-way-function for that identity,
    wherein said plurality of records contain only the corresponding value for each occurrence of the corresponding identity.

11. The non-transitory machine readable medium of claim 10, wherein the mapping of the identity of a first user to the corresponding value is deleted from said non-volatile memory to make records corresponding to said first user to be thereafter unidentifiable as being related to said first user.

12. The non-transitory machine readable medium of claim 11, wherein said one-way function is a one-way hash function.

13. The non-transitory machine readable medium of claim 10, further comprising instructions for:
    providing one or more services to registered users; and
    storing a local copy of said first set of records in each of said one or more digital processing systems.

14. The non-transitory machine readable medium of claim 10, further comprising instructions for creating said first set of records in an authentication server contained in said one or more digital processing systems,
    wherein said first set of records contains a first record indicating that an administrator one or more digital processing systems has added a new user to access one or more services provided by said one or more of digital processing systems, said new user being said first user, said first record further containing a hash value corresponding to an identity of said first user, said hash value being generated by said one-way hash function.

15. The non-transitory machine readable medium of claim 14, wherein said first record is stored in each of said one or more digital processing systems as a corresponding blockchain block according to blockchain technology.

16. A non-transitory machine readable medium storing one or more sequences of instructions for enabling an authentication server to manage data records of users, wherein execution of said one or more instructions by one or more processors contained in said authentication server causes said authentication server to perform the actions of:
    maintaining a map of each of a plurality of user identifiers to a corresponding coded value of a plurality of coded values, wherein each coded value is generated using a one-way function from the corresponding user identifier;
    storing a data record corresponding to a first user in a blockchain, said data record being stored with a first coded value corresponding to the user identifier of said first user, wherein said map is maintained external to said blockchain;
    to retrieve said data record corresponding to said first user:
    identifying said first coded value corresponding to the user identifier of said first user according to said map;
    accessing said data record from said blockchain using said first coded value identified using said map.

17. The non-transitory machine readable medium of claim 16, further comprising instructions for deleting a mapping of said first user identifier to said first coded value.

18. The non-transitory machine readable medium of claim 17, wherein said one-way function is a one way hash function.

* * * * *